United States Patent
Yoshikawa

(10) Patent No.: US 8,494,730 B2
(45) Date of Patent: Jul. 23, 2013

(54) POWER TRANSMITTING APPARATUS

(75) Inventor: Masato Yoshikawa, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 12/997,732

(22) PCT Filed: Jan. 29, 2010

(86) PCT No.: PCT/JP2010/051290
§ 371 (c)(1),
(2), (4) Date: Dec. 13, 2010

(87) PCT Pub. No.: WO2011/092856
PCT Pub. Date: Aug. 4, 2011

(65) Prior Publication Data
US 2012/0290158 A1    Nov. 15, 2012

(51) Int. Cl.
*G06F 7/00* (2006.01)
*G06F 17/00* (2006.01)
*G06F 19/00* (2006.01)

(52) U.S. Cl.
USPC ............ 701/51; 701/52; 701/53; 701/54; 701/55; 701/56; 701/57; 701/58; 701/59; 701/60; 701/61; 701/62; 701/63; 701/64; 701/65; 701/66; 701/67; 701/68; 701/69

(58) Field of Classification Search
USPC .................................................. 701/51–69
See application file for complete search history.

(56) References Cited

U.S. PATENT DOCUMENTS

| | | | | |
|---|---|---|---|---|
| 6,170,587 B1 * | 1/2001 | Bullock | ........ | 180/69.6 |
| 7,081,060 B2 * | 7/2006 | Hata et al. | ........ | 475/5 |
| 7,101,309 B2 * | 9/2006 | Ozeki et al. | ........ | 477/3 |
| 7,824,290 B1 * | 11/2010 | Brookins | ........ | 475/107 |

(Continued)

FOREIGN PATENT DOCUMENTS

| JP | A-08-014076 | 1/1996 |
|---|---|---|
| JP | A-2000-065197 | 3/2000 |

(Continued)

OTHER PUBLICATIONS

William Strunk Jr. and E.B. White, The Elements of Style 3$^{rd}$ Ed., Macmillan Publishing Co., p. 40, 1979.*

(Continued)

*Primary Examiner* — Calvin Cheung
(74) *Attorney, Agent, or Firm* — Oliff & Berridge, PLC

(57) ABSTRACT

A power transmitting apparatus includes a clutch that operates based on pressure of a fed fluid to adjust a mode of power transmission of an engine or/and a motor/generator on a power transmission route, a first driving pump that feeds the fluid to the clutch by being driven in accordance with rotation of the motor/generator, and a second driving pump that feeds the fluid to the clutch by being driven in accordance with electric power, wherein a first engagement unit and a second engagement unit can be caused to engage rapidly or slowly by selecting one of the first driving pump and the second driving pump as a source of the fluid, and when a drive request of the clutch is present and a rotation speed of the motor/generator is lower than a predetermined rotation speed, the first engagement unit and the second engagement unit are caused to engage rapidly by feeding the fluid from the second driving pump.

17 Claims, 8 Drawing Sheets

U.S. PATENT DOCUMENTS

| | | | |
|---|---|---|---|
| 8,306,707 B2* | 11/2012 | Zhang et al. | 701/51 |
| 2002/0094898 A1* | 7/2002 | Hata et al. | 475/5 |
| 2004/0189140 A1* | 9/2004 | Fukuda et al. | 310/261 |
| 2004/0220015 A1* | 11/2004 | Murakami et al. | 477/15 |
| 2005/0126874 A1* | 6/2005 | Back et al. | 192/3.3 |
| 2005/0209046 A1* | 9/2005 | Potter | 477/115 |
| 2006/0068970 A1* | 3/2006 | Rose | 477/34 |
| 2006/0231338 A1* | 10/2006 | Ichioka et al. | 184/6 |
| 2007/0049443 A1* | 3/2007 | Schmidt | 475/5 |
| 2007/0202987 A1* | 8/2007 | Kakinami et al. | 477/3 |
| 2008/0039262 A1* | 2/2008 | Cronin et al. | 475/73 |
| 2008/0093137 A1* | 4/2008 | Maeda et al. | 180/65.2 |
| 2008/0188348 A1* | 8/2008 | Kumazaki et al. | 477/35 |
| 2008/0251302 A1* | 10/2008 | Lynn et al. | 180/65.2 |
| 2009/0115263 A1* | 5/2009 | Ihara et al. | 310/42 |
| 2009/0118095 A1* | 5/2009 | Tabata et al. | 477/118 |
| 2009/0124454 A1* | 5/2009 | Tabata et al. | 477/37 |
| 2009/0134820 A1* | 5/2009 | Sugiyama et al. | 318/66 |
| 2009/0203497 A1* | 8/2009 | Imediegwu | 477/5 |
| 2009/0229393 A1* | 9/2009 | Shibata et al. | 74/335 |
| 2009/0236159 A1* | 9/2009 | Shibata et al. | 180/65.235 |
| 2010/0078281 A1* | 4/2010 | Kajigai et al. | 192/3.28 |
| 2011/0017533 A1* | 1/2011 | Bissontz | 180/65.25 |

FOREIGN PATENT DOCUMENTS

| | | |
|---|---|---|
| JP | A-2006-335195 | 12/2006 |
| JP | A-2006-335197 | 12/2006 |
| JP | A-2007-069788 | 3/2007 |
| JP | A-2009-115186 | 5/2009 |

OTHER PUBLICATIONS

Karim Nice and Julia Layton, How Hybrid Cars Work, How Stuff Works website, all pages, Dec. 10, 2009. http://web.archive.org/web/20091210155856/http://auto.howstuffworks.com/hybrid-car.htm/printable.*

International Search Report issued in Application No. PCT/JP2010/051290; dated Apr. 20, 2010 (with translation).

* cited by examiner

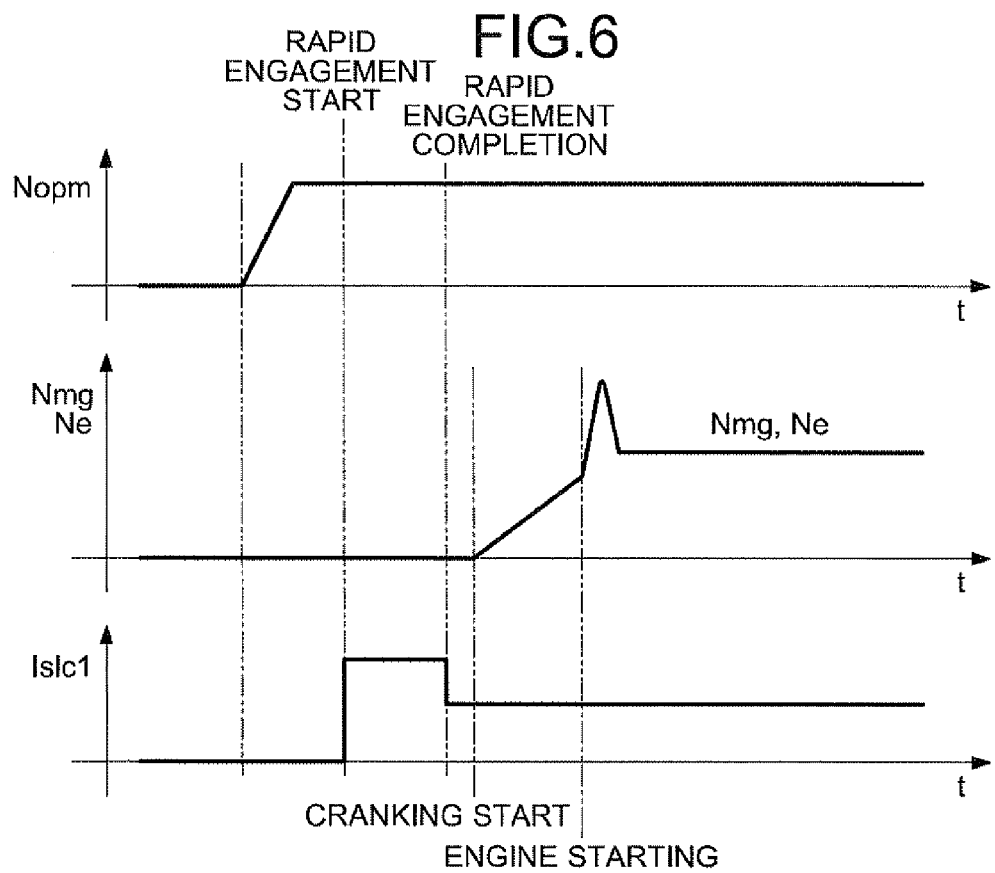
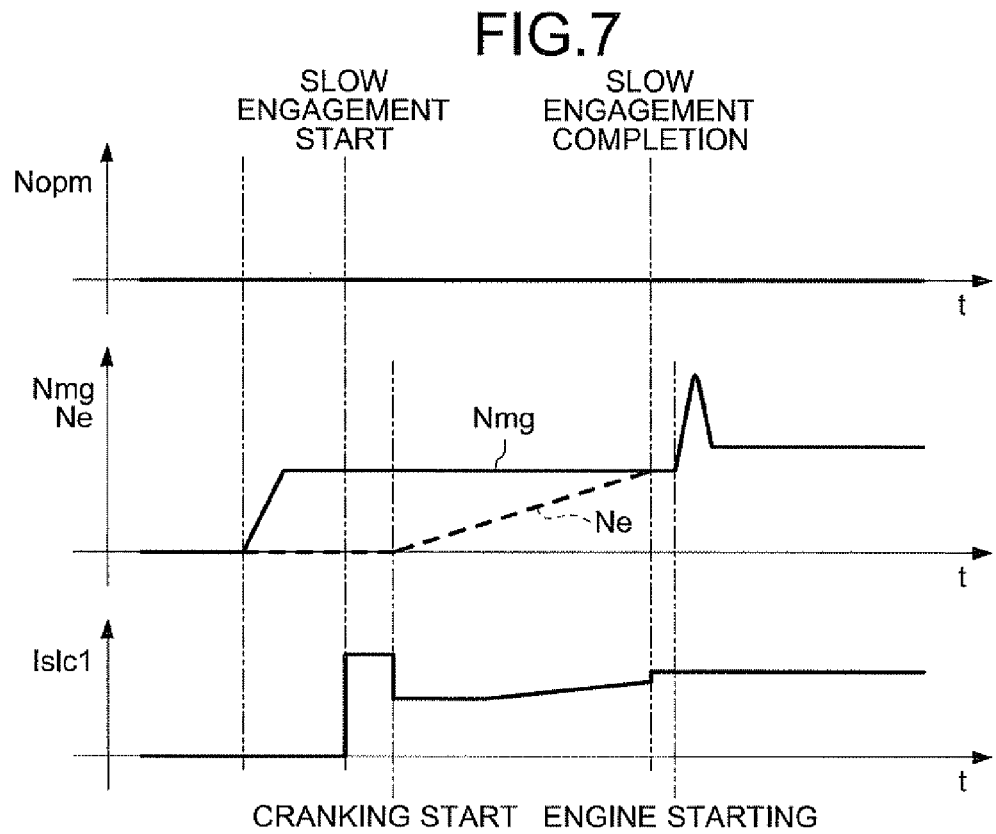

POWER TRANSMITTING APPARATUS

FIELD

The present invention relates to a power transmitting apparatus that transmits power of a power source to a drive wheel side.

BACKGROUND

Patent Literature 1 below discloses a hybrid vehicle including an engine and a motor/generator as power sources and also a power transmitting apparatus that transmits power of the power sources to a drive wheel side. The power transmitting apparatus according to Patent Literature 1 includes a clutch capable of connecting/disconnecting power transmission between the engine and the motor/generator and a clutch caused to connect/disconnect when a transmission gear stage within an automatic transmission is changed. The hybrid vehicle also has a mechanical oil pump and an electric oil pump that supply oil pressure to the automatic transmission provided therein. The mechanical oil pump is driven by power of the engine when the motor/generator fails to supply a portion of the oil pressure to the electric oil pump.

Patent Literature 2 below describes a power transmitting apparatus that includes a mechanical oil pump driven by adjusting to rotation of an engine and operates a clutch of an automatic transmission by oil pressure supplied to an AT oil pressure unit from the oil pump. Moreover, the Patent Literature 2 discloses a technology that supplies oil pressure to the AT oil pressure unit by a check valve and an accumulator before a stopped engine being restarted and connecting the clutch of the automatic transmission to a shift state for starting before the engine being started to prevent a shock during connection. Patent Literature 3 below describes a control apparatus of a transmission that engages a predetermined clutch of the transmission by oil pressure when an engine is restarted and discloses a technology that rapidly increases pressure of a fed fluid to the predetermined clutch when the engine is restarted to prevent a shock of clutch connection when the engine is restarted.

CITATION LIST

Patent Literature

Patent Literature 1: Japanese Patent Application Laid-open No. 2007-69788
Patent Literature 2: Japanese Patent Application Laid-open No. H8-14076
Patent Literature 3: Japanese Patent Application Laid-open No. 2000-65197

SUMMARY

Technical Problem

Incidentally, some types of clutch perform an engagement operation or disengagement operation by controlling an interval between an engagement unit on an input side and that on an output side by adjusting oil pressure. This type of clutch may cause a shock during engagement operation due to a rapid increase in oil pressure. If this type of clutch is arranged on a power transmission route in a power transmitting apparatus, there is a danger that the shock may be transmitted to crew inside a vehicle.

An object of the present invention is to provide a technology that improves inconvenience of such a conventional example and controls an occurrence of shock when a power transmission mode adjusting device is engaged in a power transmitting apparatus including the power transmission mode adjusting device that adjusts the mode of power transmission from a power source by engaging or disengaging a first engagement unit and a second engagement unit by pressure of a fluid.

Solution to Problem

In order to achieve the above mentioned object, a power transmitting apparatus according to the present invention, includes a power transmission route that transmits output of at least one of a mechanical power source generating a driving force by using mechanical energy as power and an electric power source generating a driving force by using the mechanical energy obtained by converting electric energy as power to a drive wheel side; a power transmission mode adjusting device that operates based on pressure of a fed fluid to adjust a mode of power transmission from the mechanical power source or/and the electric power source on the power transmission route; a first driving pump that feeds the fluid to the power transmission mode adjusting device by being driven in accordance with rotation of a rotation axis of the electric power source; and a second driving pump that feeds the fluid to the power transmission mode adjusting device by being driven in accordance with electric power, wherein a first engagement unit and a second engagement unit of the power transmission mode adjusting device can be caused to engage rapidly or slowly by selecting one of the first driving pump and the second driving pump as a source of the fluid to the power transmission mode adjusting device, and when a drive request of the power transmission mode adjusting device is present and a rotation speed of the electric power source is lower than a predetermined rotation speed, the first engagement unit and the second engagement unit are caused to engage rapidly by feeding the fluid from the second driving pump.

Further, it is desirable that when a drive request of the power transmission mode adjusting device is present and a rotation speed of the electric power source is higher than a predetermined rotation speed, the first engagement unit and the second engagement unit are caused to engage slowly by feeding the fluid from the first driving pump.

Further, it is desirable that when a drive request of the power transmission mode adjusting device is present, the first engagement unit and the second engagement unit are caused to engage rapidly by the fluid from the second driving pump if there has arisen no difference in rotation speed or torque between the first engagement unit and the second engagement unit, and the first engagement unit and the second engagement unit are caused to engage slowly by the fluid from the first driving pump if there has arisen the difference.

Here, the power transmission mode adjusting device is, for example, a clutch capable of connecting/disconnecting the power transmission from the mechanical power source to the drive wheel side.

The clutch is arranged between the mechanical power source and the electric power source to be able to connect/disconnect the power transmission therebetween.

Further, it is desirable that the clutch is arranged between the mechanical power source and the electric power source to be able to connect/disconnect the power transmission therebetween, and when the first engagement unit and the second engagement unit are caused to engage while the mechanical power source or the electric power source is rotating, the fluid is fed from the first driving pump to cause the first engagement unit and the second engagement unit to engage slowly.

Further, it is desirable that the clutch is arranged between the mechanical power source and the electric power source to be able to connect/disconnect the power transmission therebetween, and when the mechanical power source is cranked by power of the electric power source, the first engagement unit and the second engagement unit are caused to engage before the mechanical power source being started.

Further, it is desirable that the clutch is arranged between the mechanical power source and the electric power source to be able to connect/disconnect the power transmission therebetween, and when the clutch is in a disengagement state, the mechanical power source is started by using a starting apparatus that rotates the rotation axis of the mechanical power source while leaving the clutch in the disengagement state.

Further, the power transmission mode adjusting device is, for example, a transmission clutch inside a stepped automatic transmission causing connection/disconnection when a transmission gear stage of the stepped automatic transmission is switched on the power transmission route.

Further, the power transmission mode adjusting device is, for example, a forward/backward switching device arranged inside a stepless automatic transmission on the power transmission route to switch forward movement and backward movement of a vehicle by switching connection and disconnection of the first engagement unit and the second engagement unit.

Advantageous Effects of Invention

A power transmitting apparatus according to the present invention causes a power transmission mode adjusting device to engage rapidly by a fluid from an electric second driving pump when a drive request of the power transmission mode adjusting device is present and a rotation speed of an electric power source is lower than a predetermined rotation speed. Thus, in this case, responsiveness of an engagement operation of the power transmission mode adjusting device becomes better, and controllability of pressure adjustments of the fluid also becomes better. Further, in this case, if there has arisen no difference in rotation speed or torque between input and output (between a first engagement unit and a second engagement unit) of the power transmission mode adjusting device, an occurrence of shock accompanying the engagement can be controlled. When a drive request of the power transmission mode adjusting device is present and the rotation speed of the electric power source is higher than the predetermined rotation speed, the power transmitting apparatus causes the first engagement unit and the second engagement unit to engage slowly by feeding the fluid from a first driving pump. Thus, in this case, particularly if there has arisen a difference in rotation speed or the like between input and output of the power transmission mode adjusting device, a shock accompanying the engagement can be relieved.

BRIEF DESCRIPTION OF DRAWINGS

FIG. 6 is a time chart representing the rotation speed of the motor of the second driving pump, the rotation speed of the motor/generator, an engine speed, and the current value to a clutch driving device when engagement is rapid.

FIG. 7 is a time chart representing the rotation speed of the motor of the second driving pump, the rotation speed of the motor/generator, the engine speed, and the current value to the clutch driving device when engagement is slow.

DESCRIPTION OF EMBODIMENTS

A power transmitting apparatus according to the present invention includes a power transmission route that transmits power of a power source to a drive wheel side of a vehicle, a power transmission mode adjusting device that operates based on pressure of a fed fluid to adjust a mode of power transmission from the power source, and a mechanical driving pump and an electric driving pump that feed the fluid to the power transmission mode adjusting device. An embodiment of the power transmitting apparatus according to the present invention will be described in detail below based on drawings. However, the present invention is not limited by the embodiment.

Embodiment

An embodiment of a power transmitting apparatus according to the present invention will be described based on FIGS. 1 to 11. The power transmitting apparatus will be described below together with a vehicle on which the power transmitting apparatus is mounted.

Figure 1:
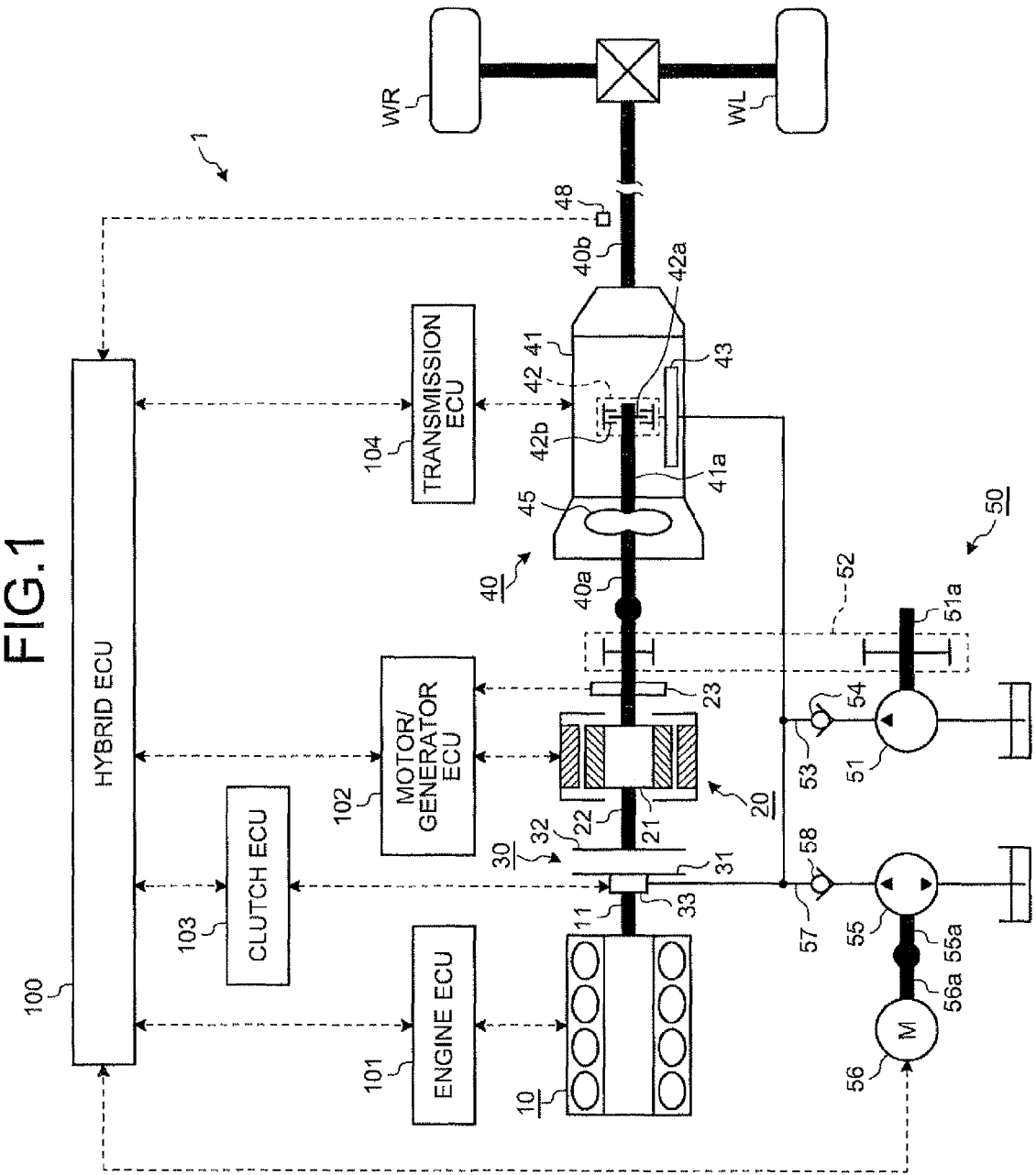
FIG. 1 is a diagram illustrating an example of a power transmitting apparatus according to the present invention and a vehicle as an application target thereof.

Reference numeral 1 in FIG. 1 is an example of a vehicle to which a power transmitting apparatus according to the present embodiment is applied and shows a hybrid vehicle including a mechanical power source using mechanical energy as power and an electric power source using mechanical energy obtained by converting electric energy as power.

The hybrid vehicle 1 includes an engine 10 that outputs mechanical power (engine torque) from an output axis (crankshaft) 11 as the mechanical power source. An internal combustion engine or external combustion engine can be considered as the engine 10. The engine 10 is controlled in its operation by an engine control unit in an electronic control unit for engine (hereinafter, referred to as an "engine ECU") 101.

The hybrid vehicle 1 also includes a motor, generator capable of driving power running, or motor/generator capable of driving both power running and regeneration as an electric power source. Here, a motor/generator 20 is taken as an example to describe the electric power source. The motor/generator 20 is constructed, for example, as a permanent-magnet AC synchronous motor and the operation thereof is controlled by an electronic control unit for motor/generator (hereinafter, referred to as an "motor/generator ECU") 102. The motor/generator 20 functions as a motor when driven for power running and converts electric energy supplied from a battery (not shown) into mechanical energy to output mechanical power (motor power running torque) from a rotation axis 22 that is coaxial with a rotor 21. When driven for regeneration, on the other hand, the motor/generator 20 functions as a generator and converts mechanical energy into electric energy when mechanical power (motor regeneration torque) is input from the rotation axis 22 to store the electric energy in the battery via an inverter (not shown) as electric power. The motor/generator 20 has a rotation sensor (resolver 23) to detect the rotation angle position of the rotor 21 (rotation axis 22) provided therein and the resolver 23 sends a detected signal to the motor/generator ECU 102.

The hybrid vehicle 1 also has a power transmitting apparatus that transmits power (engine torque or motor power running torque) of the engine 10 or the motor/generator 20 to drive wheels WL, WR as a driving force provided therein.

The power transmitting apparatus is a power transmission mode adjusting device (in other words, a power connecting/disconnecting device) that switches a state capable of transmitting power from the engine 10 or/and the motor/generator 20 by pressure of a fed fluid and a state incapable of transmitting power and includes a clutch 30 shown in FIG. 1.

More specifically, the clutch 30 not only connects/disconnects transmission of torque between the engine 10 and the drive wheels WL, WR, but also connects/disconnects transmission of torque between the engine 10 and the motor/generator 20. The clutch 30 is, for example, a friction clutch apparatus configured to be able to switch an engagement state in which a first engagement unit 31 and a second engagement unit 32 are arranged opposite to each other and a disengagement state (non-engagement state) disengaged (non-engaged) from the engagement state. The clutch 30 is arranged between the engine 10 and the motor/generator 20 and connects so that the first engagement unit 31 is rotated integrally with the output axis 11 and also the second engagement unit 32 is rotated integrally with the rotation axis 22.

The clutch 30 is to be operated by a working fluid fed from a working fluid feeding device 50 described later and is pressure-contacted by a reduced interval between the first engagement unit 31 and the second engagement unit 32 with an increasing pressure of the working fluid accompanying the feeding thereof, entering an engagement state connecting the output axis 11 and the rotation axis 22. The clutch 30 includes, for example, an elastic portion (not shown) that generates resiliency with a decreasing interval therebetween and when the pressure of the working fluid being fed is released, the first engagement unit 31 and the second engagement unit 32 are separated by resiliency thereof to switch from the engagement state to the disengagement state.

The power transmitting apparatus has a clutch driving device 33 that switches the engagement state and the disengagement state by adjusting pressure of the working fluid to the clutch 30 provided therein. As the clutch driving device 33, for example, an electromagnetic driving valve serving as a channel opening/closing valve that opens/closes the channel of a working fluid fed from the working fluid feeding device 50 or as a flow regulating valve that regulates the flow rate of the working fluid may be used. The operation of the clutch driving device 33 is controlled by an electronic control unit for clutch (hereinafter, referred to as a "clutch ECU") 103.

Further, the power transmitting apparatus includes a transmission that changes the rotation speed (torque) between input and output, wherein power of the engine 10 or/and the motor/generator 20 is input into the stepped transmission. Here, a stepped automatic transmission 40 is illustrated. The stepped automatic transmission 40 includes a transmission body 41 constructed of a group of gears, each of which constituting a transmission gear stage, and a torque converter 45 that transmits power input to an input axis 40a to the group of gears of the transmission body 41. The input axis 40a is connected to be able to rotate integrally with the rotation axis 22 of the motor/generator 20. Thus, power of the engine 10 or the motor/generator 20 is input to the input axis 40a.

The transmission body 41 has a plurality of known transmission clutches (may also be called brakes) 42 to create a combination of the group of gears in accordance with a transmission gear stage to be controlled by connection/disconnection when the transmission gear stage is switched provided therein. In FIG. 1, only one unit of the transmission clutch 42 is shown for convenience of illustration. The transmission clutch 42 is a power transmission mode adjusting device (in other words, a power connecting/disconnecting device) that operates based on pressure of a fed fluid and switches a state capable of transmitting power from the engine 10 or/and the motor/generator 20 to a gear in accordance with the transmission gear stage to be controlled and a state incapable of transmitting power. More specifically, each of the transmission clutches 42 is, for example, a friction clutch that has a first engagement unit 42a and a second engagement unit 42b arranged opposite to each other and creates an engagement state and a disengagement state by adjusting the interval between these engagement units opposite to each other using a working fluid fed from the working fluid feeding device 50 (described later). In the transmission clutch 42, for example, the first engagement unit 42a rotates integrally with an input axis 41a of the transmission body 41.

For realization of the transmission gear stage to be controlled, clutches of the plurality of transmission clutches 42 to be in an engagement state and those to be in a disengagement state are decided in accordance with the transmission gear stage. In the transmission body 41, for example, a channel of a working fluid for creating an engagement state and a channel of a working fluid for creating a disengagement state are provided for each of the transmission clutches 42. The channel is switched by a channel switching device 43 by adjusting to the transmission gear stage to be controlled. For example, as the channel switching device, an electromagnetic driving valve is used. The operation of the channel switching device 43 is controlled by an electronic control unit for transmission (hereinafter, referred to as a "transmission ECU") 104.

The input axis 41a is connected to a turbine runner (not shown) of the torque converter 45 so as to rotate integrally. Moreover, the input axis 40a of the stepped automatic transmission 40 is connected to a pump impeller (not shown) of the torque converter 45 so as to rotate integrally. Thus, the input axis 41a rotates with the rotation of the input axis 40a in the torque converter 45 under control of slip.

The hybrid vehicle 1 has an electronic control unit (hereinafter, referred to as a "hybrid ECU") 100 that controls the operation of the whole vehicle in a unifying fashion provided therein. The hybrid ECU 100 can exchange information such as detected signals and control commands of various sensors with each of the engine ECU 101, the motor/generator ECU 102, the clutch ECU 103, and the transmission ECU 104. In the present embodiment, a control apparatus of a vehicle is constituted of at least the hybrid ECU 100, the engine ECU 101, the motor/generator ECU 102, the clutch ECU 103, and the transmission ECU 104.

Further, the hybrid vehicle 1 has a power transmission mode controlling device that controls operations of the above various power transmission mode adjusting devices (the clutch 30 and the transmission clutches 42) provided therein. The power transmission mode controlling device is constituted of the hybrid ECU 100, the motor/generator ECU 102, the clutch ECU 103, and the transmission ECU 104.

The hybrid vehicle 1 includes the working fluid feeding device 50 that feeds a working fluid to the various power transmission mode adjusting devices. In the present embodiment, a working fluid such as ATF (Automatic Transmission Fluid) is used as the working fluid.

The working fluid feeding device 50 includes a mechanical first driving pump 51 driven by being linked to rotation of the rotation axis 22 of the motor/generator 20 and the input axis 40a of the stepped automatic transmission 40 and an electric second driving pump 55 driven by fed electric power.

The first driving pump 51 is connected to the rotation axis 22 of the motor/generator 20 or the input axis 40a of the stepped automatic transmission 40 through a rotation axis 51a thereof via, for example, a pump power transmitting apparatus 52 such as a group of gears and discharges a working fluid in a discharge amount decided in accordance with the rotation speed (running torque) of the rotation axis 22 or the input axis 40a and a transmission gear stage of the pump power transmitting apparatus 52 (that is, a discharge amount in accordance with the rotation speed (running torque) of the rotation axis 51a). In this case, the pump power transmitting apparatus 52 is arranged on the rotation axis 22 of the motor/generator 20. For convenience of illustration, the pump power transmitting apparatus 52 shown in FIG. 1 has gears separated from each other. Moreover, the pump power transmitting apparatus 52 need not necessarily be constituted of two gears.

A check valve 54 that does not allow a working fluid to pass to the side of the first driving pump 51 while allowing a working fluid to pass from the side of the first driving pump 51 is disposed on a discharge path 53 of the working fluid from the first driving pump 51. The discharge path 53 is communicatively connected to each working fluid inflow port of the clutch driving device 33 and the channel switching device 43. Thus, a working fluid discharged from the first driving pump 51 can be fed to the clutch driving device 33 and the channel switching device 43.

The second driving pump 55 is connected so as to rotate integrally with an output axis 56a of a motor 56 through a rotation axis 55a thereof and discharges a working fluid in a discharge amount decided in accordance with the rotation speed (output torque) of the motor 56 (that is, a discharge amount in accordance with the rotation speed (running torque) of the rotation axis 55a). In the present embodiment, the hybrid ECU 100 is caused to perform drive control of the motor 56. The hybrid ECU 100 adjusts the rotation speed (output torque) of the motor 56 by controlling electric energy fed to the motor 56 to control the discharge amount of the working fluid from the second driving pump 55.

A check valve 58 that does not allow a working fluid to pass to the side of the second driving pump 55 while allowing a working fluid to pass from the side of the second driving pump 55 is disposed on a discharge path 57 of the working fluid from the second driving pump 55. The discharge path 57 is communicatively connected to each working fluid inflow port of the clutch driving device 33 and the channel switching device 43. Thus, a working fluid discharged from the second driving pump 55 can be fed to the clutch driving device 33 and the channel switching device 43.

In the working fluid feeding device 50, the first engagement unit and the second engagement unit of various power transmission mode adjusting devices are caused to engage slowly by oil pressure of a working fluid from one of the first driving pump 51 and the second driving pump 55 and the first engagement unit and the second engagement unit thereof are caused to engage rapidly by oil pressure of a working fluid from the other. In the present embodiment, various power transmission mode adjusting devices are caused to engage slowly by oil pressure from the first driving pump 51 while various power transmission mode adjusting devices are caused to engage rapidly by oil pressure from the second driving pump 55 by making settings to be able to make the discharge amount of the working fluid per unit time from the second driving pump 55 larger than the maximum discharge amount of the working fluid per unit time from the first driving pump 51. If, for example, the first driving pump 51 and the second driving pump 55 have the same pump capacity, a motor capable of driving the second driving pump 55 at a higher rotation speed than the maximum rotation speed of the first driving pump 51 is used as the motor 56. Accordingly, the second driving pump 55 can make the discharge amount of the working fluid per unit time larger than the maximum discharge amount of the working fluid per unit time by the first driving pump 51 so that oil pressure of the working fluid can be made to rise more rapidly than the first driving pump 51. The pump capacity is the discharge amount of a working fluid when the rotation axis 51a or the rotation axis 55a makes one revolution.

If, for example, a power transmission mode adjusting device to be engaged is caused to engage rapidly, the time necessary for an engagement operation can be reduced, making responsiveness of the power transmission mode adjusting device better. When the power transmission mode adjusting device is caused to engage slowly, it is necessary to finely adjust oil pressure according to the oil temperature or the like to compensate for appropriate oil pressure of the working fluid adjusting to the temperature of a working fluid (that is, the viscosity of a working fluid), the degree of progress of an engagement operation such as slip, and the rotation speed or torque between input and output (between the first engagement unit and second engagement unit). However, there is no need for compensation when engagement occurs rapidly because oil pressure rises in a short time so that the wave form of an oil pressure instruction value of a working fluid to the power transmission mode adjusting device to be engaged, in other words, the wave form of the current value applied to the motor 56 or the clutch driving device 33 and the channel switching device 43 configured as an electromagnetic driving valve can be simplified. Thus, controllability when engagement occurs rapidly becomes better than when engagement occurs slowly.

On the other hand, if the power transmission mode adjusting device to be engaged is caused to engage slowly, a shock accompanying the engagement can be relieved even if a difference arises in rotation speed or torque between input and output thereof.

Thus, respective advantages are different for rapid engagement and slow engagement. If, despite the advantages, there is a difference in rotation speed or torque between input and output of the power transmission mode adjusting device to be engaged when rapid engagement is applied, there is a possibility that the power transmission mode adjusting device causes a sharp shock accompanying the engagement. Compared with rapid engagement, slow engagement is inferior in responsiveness because an engagement operation time is longer and moreover, as described above, complex control of the oil pressure instruction value (current value) in accordance with the temperature of a working fluid or the like is needed. Respective disadvantages can be overcome by selecting the other engagement mode. Thus, in the present embodiment, the engagement operation making use of respective advantages are caused to be performed by using the rapid engagement and slow engagement for different situations. The power transmission mode controlling device is caused to use the rapid engagement and slow engagement for different situations. The proper use thereof can roughly be divided as follows:

If the rotation speed of the motor/generator 20 (the rotation speed of the input axis 40a of the stepped automatic transmission 40) is equal to or less than a predetermined rotation speed and the second driving pump 55 is conditioned for use, various power transmission mode adjusting devices can be caused to engage rapidly by using oil pressure of a working fluid from the second driving pump 55. The predetermined rotation speed is a rotation speed equal to or less than the maximum rotation speed when a shock accompanying the engagement of the power transmission mode adjusting device to be engaged is within an allowable range and is set here to 0 or substantially 0. A condition of being equal to or less than the predetermined rotation speed is set so that an occurrence of shock accompanying rapid engagement can be controlled. A condition of the second driving pump 55 being available is set because, if the second driving pump 55 is available, the power transmission mode adjusting device to be engaged can be caused to engage more responsively without driving the motor/generator 20 (first driving pump 51). Thus, if both conditions are satisfied and the power transmission mode adjusting device to be engaged should be caused to engage responsively or a shock accompanying the engagement should not be caused, the power transmission mode controlling device causes the power transmission mode adjusting device to engage rapidly by oil pressure of a working fluid from the second driving pump 55.

If the second driving pump 55 is not available or the range of use thereof is limited, by contrast, it may not be possible to engage the power transmission mode adjusting device by using oil pressure of a working fluid from the second driving pump 55. Cases when the second driving pump 55 is not available or the range of use thereof is limited are when, for example, supply power to the motor 56 is insufficient or the motor 56 or the second driving pump 55 is overheated. Thus, the power transmission mode controlling device in this case preferably operates the first driving pump 51 by driving the motor/generator 20 if stopped regardless of situations at that point to cause the power transmission mode adjusting device to be engaged to engage slowly by using oil pressure of a working fluid from the first driving pump 51.

Further, regardless of engagement control of various power transmission mode adjusting devices, the rotation axis 22 of the motor/generator 20 (input axis 40a of the stepped automatic transmission 40) may already be rotating faster than the predetermined rotation speed. In this case, a large difference in rotation speed or torque is likely to have arisen between input and output of the power transmission mode adjusting device to be engaged in a disengagement state and thus, there is a danger that a sharp shock is caused if the power transmission mode adjusting device is caused to engage rapidly. Thus, the power transmission mode controlling device in this case preferably causes the power transmission mode adjusting device to be engaged to engage slowly by oil pressure of a working fluid from the first driving pump 51 already being driven by rotation thereof.

An example of a series of control operations by the power transmission mode controlling device will be described using the flow chart in FIG. 2.

First, the hybrid ECU 100 determines whether the vehicle is running or stopped (step ST1). The clutch 30 in a disengagement state while the vehicle is running, for example, only by power of the motor/generator 20 (hereinafter, referred to as "EV running") has a difference in rotation speed or torque between input and output thereof so that there is a danger that a shock is caused when engagement occurs rapidly. If the transmission clutch 42 of the stepped automatic transmission 40 is in a disengagement state while the vehicle is running, there has arisen a difference in rotation speed or torque between input and output thereof so that there is a danger that a shock is caused when engagement occurs rapidly. Thus, it is better not to cause the power transmission mode adjusting device to be engaged in a disengagement state to engage rapidly while the vehicle is running. Therefore, in step ST1, whether running or stopped is determined to judge whether to cause the power transmission mode adjusting device to engage rapidly.

In step ST1, for example, a rotation speed Nc of an output axis 40b of the stepped automatic transmission 40 is compared with a stop determination threshold value Ncstp and, if the rotation speed Nc is equal to or less than the stop determination threshold value Ncstp, the hybrid ECU 100 is caused to determine that the vehicle is stopped. Information of the rotation speed. Nc is obtained by using a detection signal of a detection device 48. The detection device 48 is, for example, a rotation angle sensor that detects the rotation angle of the output axis 40b. The stop determination threshold value Ncstp is set to 0 or substantially 0.

If the vehicle is determined to be stopped, the hybrid ECU 100 determines whether the motor/generator 20 is rotating or stopped (step ST2). As described above, the clutch 30 while EV running may cause a shock accompanying rapid engagement. Moreover, the input axis 40a of the stepped automatic transmission 40 also rotates accompanying rotation of the motor/generator 20 and thus, the transmission clutch 42 in a disengagement state of the plurality of transmission clutches 42 may cause a shock accompanying rapid engagement due to a difference in rotation speed or torque between input and output thereof. Thus, it is better not to cause the power transmission mode adjusting device to be engaged in a disengagement state to engage rapidly while the motor/generator 20 is rotating. Therefore, in step ST2, whether the motor/generator 20 is rotating is determined to judge whether to cause the power transmission mode adjusting device to engage rapidly.

In step ST2, for example, a rotation speed of the motor/generator 20 (hereinafter, referred to as an "MG rotation speed") Nmg is compared with a stop determination threshold value of the motor/generator 20 (hereinafter, referred to as an "MG stop determination threshold value") Nmgstp and, if the MG rotation speed Nmg is equal to or less than the MG stop determination threshold value Nmgstp, the hybrid ECU 100 is caused to determine that the motor/generator 20 is stopped. Information of the MG rotation speed Nmg is a detection result by the resolver 23 and is received from the motor/generator ECU 102. The MG stop determination threshold value Nmgstp is set to 0 or substantially 0.

If the motor/generator 20 is determined to be stopped in step ST2, the hybrid ECU 100 determines whether the second driving pump 55 can be driven (step ST3). In step ST3, for example, criteria when the second driving pump 55 is not usable or the range of use thereof is limited as described above are used. If cases when the second driving pump 55 is not usable or the range of use thereof is limited do not apply, the hybrid ECU 100 is caused to determine that the second driving pump 55 can be driven.

If the second driving pump 55 is determined to be drivable in step ST3, the hybrid ECU 100 determines whether the power transmission mode adjusting device to be engaged can be engaged by a working fluid from the second driving pump 55 (step ST4). The second driving pump 55 has an upper limit of the amount of working fluid that can be discharged due to its performance or the performance of the motor 56. The upper limit thereof also changes depending on the temperature of the working fluid and decreases as the temperature drops or the viscosity increases. Further, the same amount of working fluid (that is, the same oil pressure) is not fed to all power transmission mode adjusting devices and power (torque) to be transmitted may also change between input and output thereof. Generally, higher oil pressure is needed with increasing power (torque). Thus, if, for example, there is a plurality of types of power transmission mode adjusting devices to be engaged and these devices need to be caused to engage substantially simultaneously, there is a danger that desired rapid engagement may not be practicable because the working fluid from the second driving pump 55 is insufficient depending on the type or number thereof, power (torque) transmitted between input and output, performance of the second driving pump 55 or the like, or the temperature of working fluid. Therefore, in step ST4, a determination is made based on the type thereof or the like and if desired rapid engagement is determined to be impracticable, the hybrid ECU 100 determines that engagement by the working fluid from the second driving pump 55 is impossible.

Figure 3:
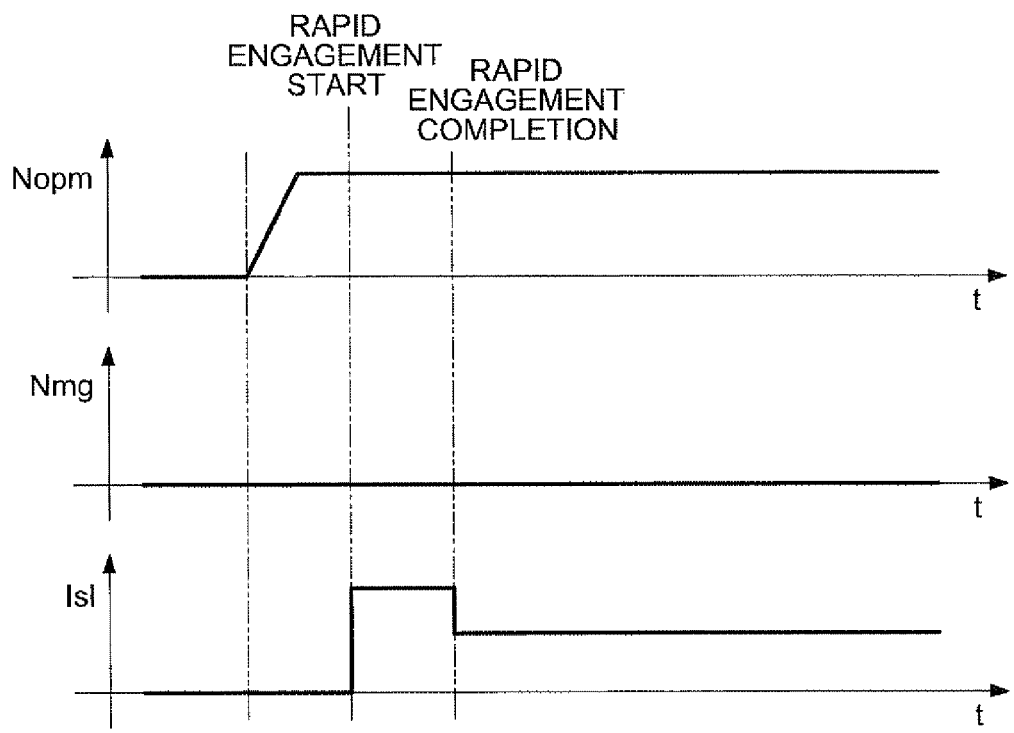
FIG. 3 is a time chart representing a rotation speed of a motor of a second driving pump, a rotation speed of a motor/generator, and a current value to an actuator of a power transmission mode adjusting device when engagement is rapid.

If engagement by the working fluid from the second driving pump 55 is determined to be possible in step ST4, the hybrid ECU 100 drives the second driving pump 55 by driving the motor 56 to increase a rotation speed Nopm thereof as shown in FIG. 3 (step ST5). For example, the rotation speed Nopm may be increased to a predetermined level or a level in accordance with oil pressure of the working fluid needed for the power transmission mode adjusting device to be engaged. Accordingly, the second driving pump 55 discharges the working fluid of the discharge amount in accordance with the rotation speed Nopm to increase oil pressure for the power transmission mode adjusting device to be engaged.

Then, the hybrid ECU 100 causes the power transmission mode adjusting device to be engaged to engage rapidly after feeding of the oil pressure starts (step ST6). At this point, the hybrid ECU 100 sends a command to increase a current value Isl, as shown in FIG. 3, to the actuator (the clutch driving device 33 or the channel switching device 43) of the power transmission mode adjusting device to be engaged to the applicable motor/generator ECU 102, clutch ECU 103, or transmission ECU 104. Accordingly, the applicable actuator is driven/controlled and oil pressure of the working fluid rises rapidly in the power transmission mode adjusting device to be engaged so that the first engagement unit and the second engagement unit are engaged rapidly. Therefore, in this case, an effect of the rapid engagement described above can be obtained. Further, in this case, no difference in rotation speed or torque has arisen between the first engagement unit and the second engagement unit and thus, an occurrence of shock during engagement can be suppressed. After engagement of the power transmission mode adjusting device being completed, as shown in FIG. 3, the hybrid ECU 100 lowers the current value Isl to the actuator to a magnitude at which a complete engagement state of the power transmission mode adjusting device can be maintained. The complete engagement state is a state in which the first engagement unit and the second engagement unit rotate integrally without slip.

Figure 4:
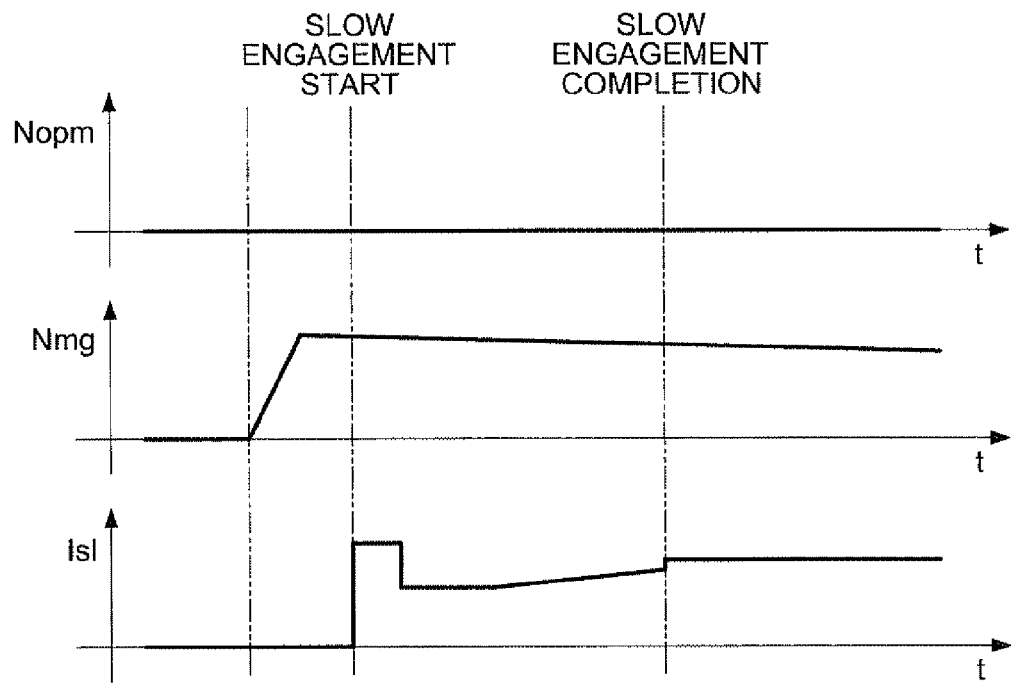
FIG. 4 is a time chart representing the rotation speed of the motor of the second driving pump, the rotation speed of the motor/generator, and the current value to the actuator of the power transmission mode adjusting device when engagement is slow.

If a negative determination is made in any of steps ST1 to ST4 described above, it is undesirable or impossible to perform rapid engagement using a working fluid from the second driving pump 55. Thus, in this case, the power transmission mode adjusting device to be engaged is caused to engage slowly by using a working fluid of the first driving pump 51. In this case, the motor 56 is not caused to drive or cannot be driven thus, the rotation speed Nopm remains, as shown in FIG. 4, 0.

More specifically, the motor/generator 20 rotates while the vehicle is running. Thus, the motor/generator 20 is rotating not only when a negative determination is made in step ST2, but also when a negative determination is made in step ST1. Thus, if a negative determination is made in step ST1 or ST2, the first driving pump 51 is already being driven to increase oil pressure for the power transmission mode adjusting device to be engaged. If a negative determination is made in step ST3 or ST4, by contrast, as is evident from a positive determination in step ST2, the motor/generator 20 is stopped. Therefore, if a negative determination is made in step ST3 or ST4, the hybrid ECU 100 requests starting of the motor/generator 20 from the motor/generator ECU 102 to drive the motor/generator 20 (step ST7). Accordingly, the rotation speed Nmg of the motor/generator 20 rises as shown in FIG. 4 and the stopped first driving pump 51 starts to be driven. Then, the first driving pump 51 discharges a working fluid to increase oil pressure for the power transmission mode adjusting device to be engaged.

If a negative determination is made thereafter or in step ST1 or ST2, the hybrid ECU 100 causes the power transmission mode adjusting device to be engaged to engage slowly (step ST8). At this point, the hybrid ECU 100 sends a command to increase the current value Isl to the actuator of the power transmission mode adjusting device. Since slow engagement is caused here, as shown in FIG. 4, the current value Isl increases oil pressure in a short pulse width and, after allowing the oil pressure to fall once, increases the oil pressure gradually. Accordingly, oil pressure of the working fluid rises gradually after the applicable actuator being driven/controlled in the power transmission mode adjusting device to be engaged so that the first engagement unit and the second engagement unit are engaged slowly. Therefore, when a difference in rotation speed or torque between the first engagement unit and the second engagement unit arises, a shock during engagement can be relieved despite the presence of such a difference. When it is impossible to drive or use the second driving pump 55, the power transmission mode adjusting device can be engaged while suppressing an occurrence of shock. After engagement of the power transmission mode adjusting device being completed, as shown in FIG. 4, the hybrid ECU 100 adjusts the current value Isl to the actuator to a magnitude at which a complete engagement state thereof can be maintained. Here, the current value Isl is slightly increased.

Thus, regardless of whether a difference in rotation speed or torque arises between input and output of the power transmission mode adjusting device to be engaged, a power transmitting apparatus according to the present embodiment can suppress an occurrence of shock during engagement thereof.

The control operation of each type of power transmission mode adjusting device will be described more specifically below.

First, a concrete example of the clutch 30 will be described using the flow chart in FIG. 5.

Figure 2:
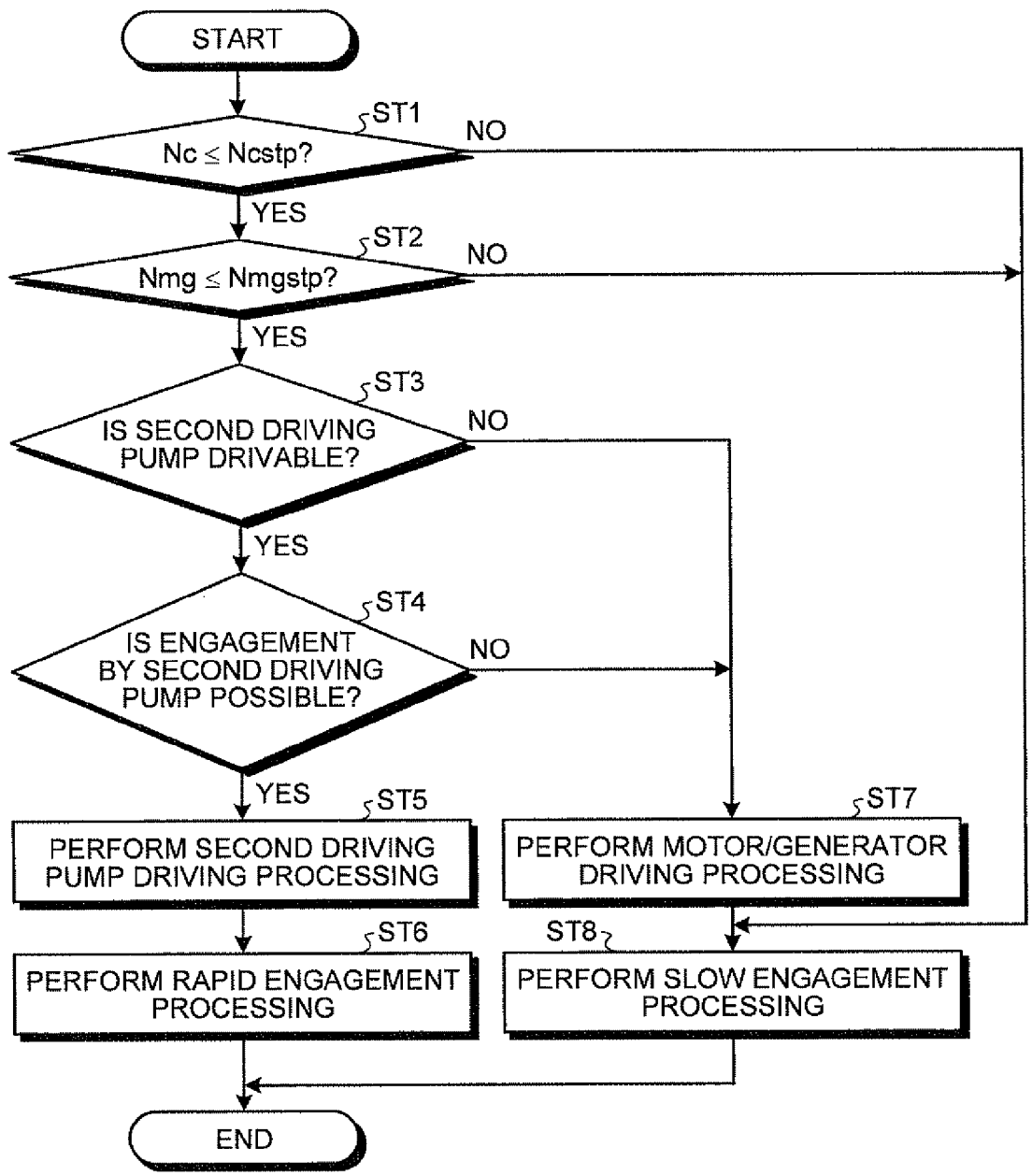
FIG. 2 is a flow chart explaining an engagement processing operation of the power transmitting apparatus according to the present invention.

Also in the case of the clutch 30, like steps ST1 to ST5 shown in FIG. 2, the hybrid ECU 100 determines whether the vehicle is stopped (steps ST11 to ST14) and if a positive determination is made in all steps, the hybrid ECU 100 increases the rotation speed Nopm of the motor 56 as shown in FIG. 6 to drive the second driving pump 55 (step ST15).

Since the oil pressure of the working fluid rises for the clutch 30 to be engaged after the second driving pump 55 being driven, the hybrid ECU 100 sends a command to the clutch ECU 103 to increase a current value Islc1 to the clutch driving device 33 as shown in FIG. 6 to cause the clutch 30 engage rapidly (step ST16). After the rapid engagement being completed, as shown in FIG. 6, the hybrid ECU 100 lowers the current value Islc1 to a magnitude at which the complete engagement state of the clutch 30 can be maintained.

Then, the hybrid ECU 100 causes starting processing of the engine 10 to perform (step ST17). In the engine starting processing after rapid engagement, the engine 10 is cranked by causing the motor/generator 20 to be driven. Thus, in step ST17, after a command being sent to the engine ECU 101 and the motor/generator ECU 102, as shown in FIG. 6, the engine 10 starts to crank together with rotation of the motor/generator 20 (MG rotation speed Nmg=engine speed Ne), and when the engine speed Ne reaches a predetermined rotation speed, the engine 10 is started by ignition or the like. In the engine starting processing, the hybrid ECU 100 determines whether starting of the engine 10 is completed (step ST18) and if engine starting is not completed such as during cranking, the hybrid ECU 100 returns to step ST17 to continue the engine starting processing and if starting of the engine 10 is completed, the hybrid ECU 100 terminates the present processing operation.

Thus, when the engine 10 is caused to start while the vehicle is stopped or the motor/generator 20 is stopped, a power transmitting apparatus according to the present embodiment engages the clutch 30 by using the electric second driving pump 55 before the engine 10 or the motor/generator 20 being rotated. Thus, no difference in rotation speed or torque has arisen between the first engagement unit 31 and the second engagement unit 32 before engagement in the clutch 30 and thus, an occurrence of shock during engagement can be suppressed. Moreover, no slip occurs during engagement in the clutch 30 so that heating accompanying such slip can be suppressed and durability thereof can be improved. Further, the clutch 30 is caused to engage rapidly in this case and thus, responsiveness and controllability of the engagement operation become better. Particularly when the engine 10 while the vehicle is stopped is started, the engine 10 can swiftly be shifted to starting processing with improved responsiveness of the engagement operation so that the time needed before the engine is started can be shortened.

When the engine 10 is caused to start while the vehicle is running (more specifically, EV running), by contrast, the motor/generator 20 is already rotating and relative rotation occurs between the first engagement unit 31 and the second engagement unit 32 and thus, it is desirable to engage the clutch 30 by a slow engagement operation because rapid engagement is likely to cause a shock. Further, when the engine 10 is started while the motor/generator 20 is already rotating even if the vehicle is stopped, it is desirable to engage the clutch 30 by a slow engagement operation rather than rapid engagement that causes a shock accompanying the engagement. Thus, if a determination is made in step ST11 that the vehicle is running or in step ST12 that the motor/generator 20 is rotating, the first driving pump 51 is already being driven accompanying the rotation and thus, the hybrid ECU 100 proceeds to steps ST20 and ST21 described later to perform engine starting processing by causing the clutch 30 to engage slowly.

If the second driving pump 55 is judged to be not drivable or not usable and a negative determination is made in step ST13 or ST14, like step ST7 in FIG. 2, the hybrid ECU 100 causes the motor/generator 20 to be driven (step ST19). FIG. 7, for example, shows a time chart when the second driving pump 55 is judged to be not drivable or not usable while the vehicle is stopped and the MG rotation speed Nmg rises as the stopped motor/generator 20 is driven.

At this point or if a negative determination is made in step ST11 or ST12, oil pressure of a working fluid is fed from the first driving pump 51 toward the clutch 30 and the hybrid ECU 100 starts slow engagement processing (step ST20). Accordingly, as shown in FIG. 7, the engine 10 starts cranking (Ne>0). After the slow engagement is completed, as shown in FIG. 7, the hybrid ECU 100 lowers the current value Islc1 to the clutch driving device 33 to a magnitude at which the complete engagement state of the clutch 30 can be maintained.

Then, the hybrid ECU 100 causes starting processing of the engine 10 to perform (step ST21). The engine starting processing is different depending on the engine speed Ne and whether the clutch 30 has completed the slow engagement processing.

It is not desirable to significantly change the MG rotation speed Nmg without reference to running because, for example, vehicle acceleration/deceleration is affected during EV running. Thus, if the MG rotation speed Nmg during EV running when a negative determination is made in step ST11 is high, the engine speed Ne may exceed a predetermined rotation speed needed to start the engine 10 during slow engagement operation of the clutch 30. However, if the engine 10 is started during slow engagement operation, the engine speed Ne may exceed the MG rotation speed Nmg at one burst, causing slip in the clutch 30. Therefore, if the engine speed Ne exceeds the predetermined rotation speed in the process of slow engagement operation during EV running, as shown, for example, in FIG. 7, it is desirable to wait until the slow engagement processing terminates and then to start the engine 10 by ignition or the like. Also when a negative determination is made in step ST12, the engine speed Ne may exceed the predetermined rotation speed in the process of slow engagement operation depending on the MG rotation speed Nmg at that point. Therefore, also in this case, it is desirable to start the engine 10 after the slow engagement processing terminates.

On the other hand, if the MG rotation speed Nmg is low and the engine speed Ne cannot exceed the predetermined rotation speed, the engine 10 cannot be started even after the clutch 30 completes slow engagement. Thus, it is desirable to start the engine 10 by increasing the MG rotation speed Nmg after the clutch 30 completes slow engagement so that vehicle acceleration/deceleration is not affected during EV running. If a negative determination is made in step ST12, vehicle acceleration/deceleration is not affected and thus, increasing the MG rotation speed Nmg is not limited subsequent to completion of slow engagement and may be during slow engagement operation (before slow engagement is completed if possible).

Also when the engine starting processing is performed, the hybrid ECU 100 determines whether starting of the engine 10 is completed (step ST22) and if starting of the engine 10 is not completed, the hybrid ECU 100 returns to step ST21 to continue the engine starting processing and if starting of the engine 10 is completed, the hybrid ECU 100 terminates the present processing operation.

Thus, when the engine 10 is caused to start in situations where the motor/generator 20 is already rotating like during running in a power transmitting apparatus according to the present embodiment, the clutch 30 is caused to engage slowly before the engine 10 being started by using a working fluid from the first driving pump 51 already being driven by rotation of the motor/generator 20. That is, if the engine 10 is started in situations where a difference in rotation speed or torque has arisen between input and output of the clutch 30 before being engaged in the power transmitting apparatus, the clutch 30 is caused to engage slowly before the engine 10 being started by the working fluid from the first driving pump 51. Thus, in this case, a shock accompanying the engagement can be relieved even if such a difference has arisen. When the engine 10 is caused to start in situations where the second driving pump 55 is not drivable or not usable in the power transmitting apparatus, the first driving pump 51 is operated by driving the motor/generator 20 to cause the clutch 30 to engage slowly before the engine 10 being started by using the working fluid from the first driving pump 51. Thus, when the engine 10 is caused to start in the power transmitting apparatus in situations thereof, the clutch 30 can be caused to engage while suppressing an occurrence of shock.

As described above, regardless of whether a difference in rotation speed or the like has arisen between input and output of the clutch 30 in the power transmitting apparatus, an engine can be started while suppressing an occurrence of shock during clutch engagement.

The present invention can be applied even if the engine 10 does not include a starter motor as a starting apparatus. However, if the engine 10 includes a starter motor, the engine 10 may be cranked by using the starter motor particularly when the clutch 30 is engaged rapidly. Moreover, if the engine 10 includes a starter motor, the engine 10 can be started while the clutch 30 is in a disengagement state.

Though inferior in responsiveness or controllability, when a positive determination is made in all steps of ST11 to ST14, the engine 10 may be caused to start after rotating the motor/generator 20 if the motor/generator 20 is not rotating and causing the clutch 30 to engage slowly by feeding a working fluid from the first driving pump 51 before the engine 10 being started.

Figure 5:
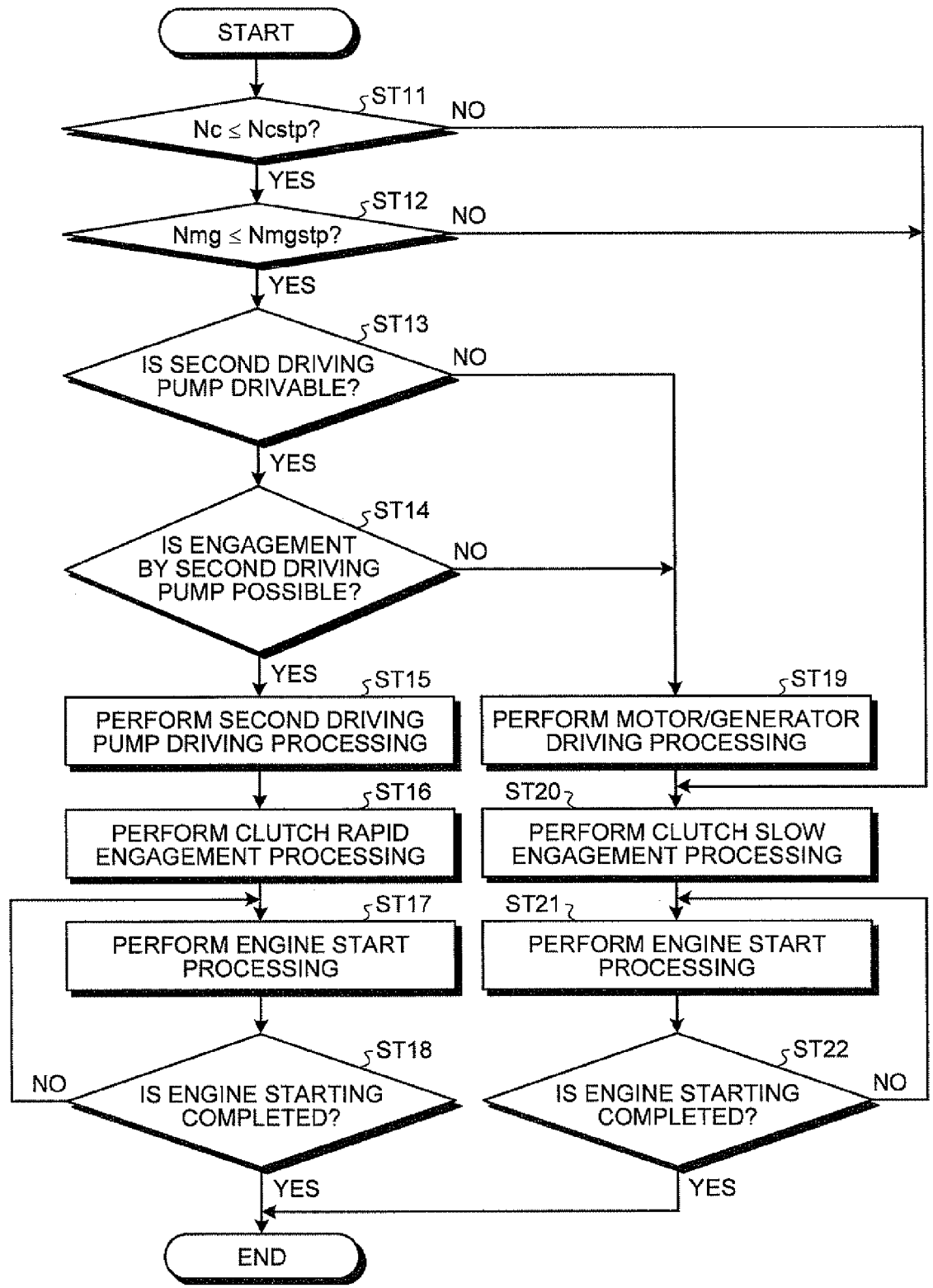
FIG. 5 is a flow chart explaining the engagement processing operation of a clutch of the power transmitting apparatus according to the present invention.

Further, the illustration in FIG. 5 has provided a description about the engagement operation of the clutch 30 when the engine 10 is caused to start. Thus, if the clutch 30 is caused to engage while the motor/generator 20 is rotating, the clutch 30 is caused to engage slowly by using a working fluid from the first driving pump 51. If, on the other hand, the engine 10 is already rotating, the clutch 30 in a disengagement state could be caused to engage. In this case, the motor/generator 20 is rotated if the motor/generator 20 is not rotating and the clutch 30 is caused to engage slowly by feeding a working fluid from the first driving pump 51. Therefore, in this case, a shock during engagement can be relieved.

Next, a concrete example of the transmission clutch 42 will be described using the flow chart in FIG. 8.

Figure 9:
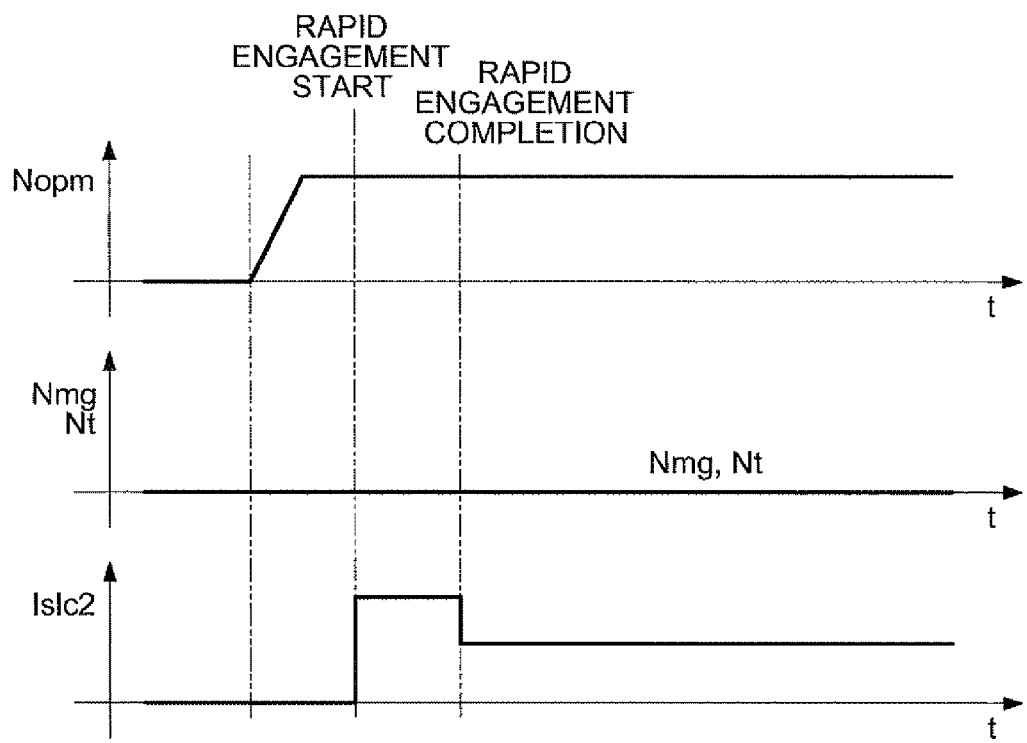
FIG. 9 is a time chart representing the rotation speed of the motor of the second driving pump, the rotation speed of the motor/generator, an input rotation speed into a transmission body, and the current value to a channel switching device when engagement is rapid.

Also in the case of the transmission clutch 42, like steps ST1 to ST5 shown in FIG. 2, the hybrid ECU 100 determines whether the vehicle is stopped (steps ST31 to ST34) and if a positive determination is made in all steps, the hybrid ECU 100 increases the rotation speed Nopm of the motor 56 as shown in FIG. 9 to drive the second driving pump 55 (step ST35).

Since oil pressure of the working fluid rises for all the transmission clutches 42 inside the stepped automatic transmission 40 as the second driving pump 55 is driven, the hybrid ECU 100 sends a command to the transmission ECU 104 to cause the transmission clutches 42 to be engaged of all the transmission clutches 42 to engage rapidly (step ST36). At this point, the transmission ECU 104 applies a current value Islc2 increased as shown in FIG. 9 to the channel switching device 43 and switches the channel of the channel switching device 43 so that oil pressure of the working fluid from the second driving pump 55 is fed to the transmission clutches 42 to be engaged to engage the transmission clutches 42 rapidly. After the rapid engagement is completed, as shown in FIG. 9, the hybrid ECU 100 lowers the current value Islc2 to a magnitude at which the complete engagement state of the transmission clutches 42 can be maintained and squeezes the channel by, for example, decreasing a valve opening angle.

Thus, when the transmission clutches 42 to be engaged are caused to engage while the vehicle is stopped or the motor/generator 20 is stopped in a power transmitting apparatus according to the present embodiment (in a so-called garage shift), the transmission clutches 42 to be engaged are caused to engage before power of the engine 10 or the motor/generator 20 being transmitted to the input axis 41a (in a state in which a rotation speed Nt of the input axis 41a is 0) by using the electric second driving pump 55. The garage shift is to shift the stepped automatic transmission 40 while the vehicle is stopped from a neutral range or parking range to a running range or to switch the transmission gear stage. Thus, no difference in rotation speed or torque has arisen between the first engagement unit 42a and the second engagement unit 42b before engagement and the transmission clutches 42 can suppress an occurrence of shock during engagement. Like the rapid engagement of the clutch 30 described above, no slip occurs during engagement in the transmission clutches 42 so that heating can be suppressed and durability thereof can be improved. Further, the transmission clutches 42 are caused to engage rapidly in this case and thus, responsiveness and controllability of the engagement operation become better. Particularly, with improved responsiveness of the engagement operation, the stepped automatic transmission 40 can switch the gear shift range or transmission gear stage swiftly while the vehicle is stopped.

When the transmission gear stage is switched while the vehicle is running (during EV running), by contrast, the input axis 41a is already rotating and relative rotation occurs between the first engagement unit 42a and the second engagement unit 42b and thus, it is desirable to engage the transmission clutches 42 to be engaged by a slow engagement operation because rapid engagement is likely to cause a shock. Further, when the transmission gear stage is switched while the motor/generator 20 is already rotating even if the vehicle is stopped, it is desirable to engage the transmission clutches 42 to be engaged by a slow engagement operation rather than rapid engagement that causes a shock accompanying the engagement. Thus, if a determination is made in step ST31 that the vehicle is running or in step ST32 that the motor/generator 20 is rotating, the hybrid ECU 100 proceeds to step ST38 described later to switch the transmission gear stage by causing the transmission clutches 42 to be engaged to engage slowly by the working fluid from the first driving pump 51 already driven.

Figure 10:
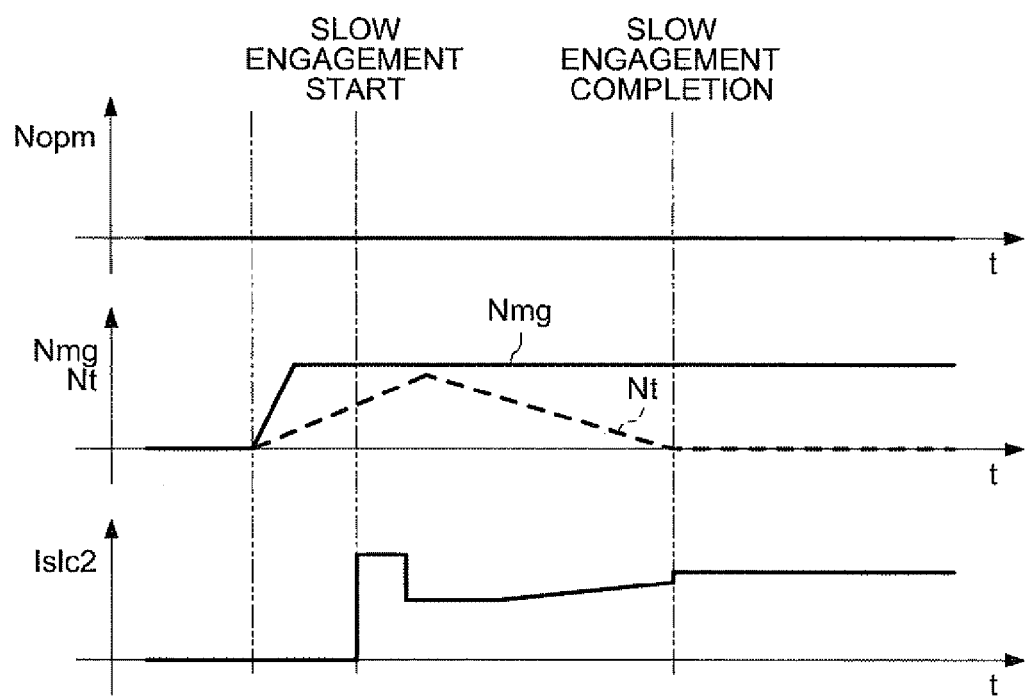
FIG. 10 is a time chart representing the rotation speed of the motor of the second driving pump, the rotation speed of the motor/generator, the input rotation speed into the transmission body, and the current value to the channel switching device when engagement is slow.

If a negative determination is made in step ST33 or ST34 by judging that the second driving pump 55 is not drivable or not usable, like step ST7 in FIG. 2, the hybrid ECU 100 causes the motor/generator 20 to be driven (step ST37). FIG. 10, for example, shows a time chart when the second driving pump 55 is judged to be not drivable or not usable while the vehicle is stopped, and the MG rotation speed Nmg rises as the stopped motor/generator 20 is driven and also the rotation speed Nt of the input axis 41a is gradually rises with action of the torque converter 45.

At this point or if a negative determination is made in step ST31 or ST32, oil pressure of a working fluid is fed from the first driving pump 51 toward all the transmission clutches 42 and thus, like step ST8 in FIG. 2, the hybrid ECU 100 performs slow engagement processing of the transmission clutches 42 to be engaged (step ST38). According to the illustration in FIG. 10, the rotation speed Nt of the input axis 41a that has risen gradually falls due to a mutual frictional force as the first engagement unit 42a and the second engagement unit 42b begin to actually engage before the rotation speed Nt falls to 0 together with completion of the slow engagement to complete the gear change. The hybrid ECU 100 determines whether the engagement of the transmission clutches 42 is completed (step ST39) and if the engagement is not completed, the hybrid ECU 100 returns to step ST38 to continue the slow engagement processing operation and if the engagement is completed, the hybrid ECU 100 terminates the present processing operation.

Thus, when the gear shift range or transmission gear stage of the stepped automatic transmission 40 is switched in situations where the motor/generator 20 is already rotating like during running, that is, in situations where a difference in rotation speed or torque has arisen between input and output of the transmission clutches 42 to be engaged in a power transmitting apparatus according to the present embodiment, the transmission clutches 42 to be engaged is caused to engage slowly by using a working fluid from the first driving pump 51 already being driven by rotation of the motor/generator 20. Thus, in this case, a shock accompanying the engagement can be relieved even if such a difference has arisen. When the gear shift range or the like is switched in situations where the second driving pump 55 is not drivable or not usable in the power transmitting apparatus, the first driving pump 51 is operated by driving the motor/generator 20 to cause the transmission clutches 42 to be engaged to engage slowly by using the working fluid from the first driving pump 51. Thus, when the gear shift range or the like is switched in the power transmitting apparatus in situations thereof, the transmission clutches 42 to be engaged can be caused to engage while suppressing an occurrence of shock.

As described above, regardless of whether a difference in rotation speed or the like has arisen between input and output of the transmission clutches 42 to be engaged in the power transmitting apparatus, the gear shift range or transmission gear stage can be switched while suppressing an occurrence of shock.

Figure 11:
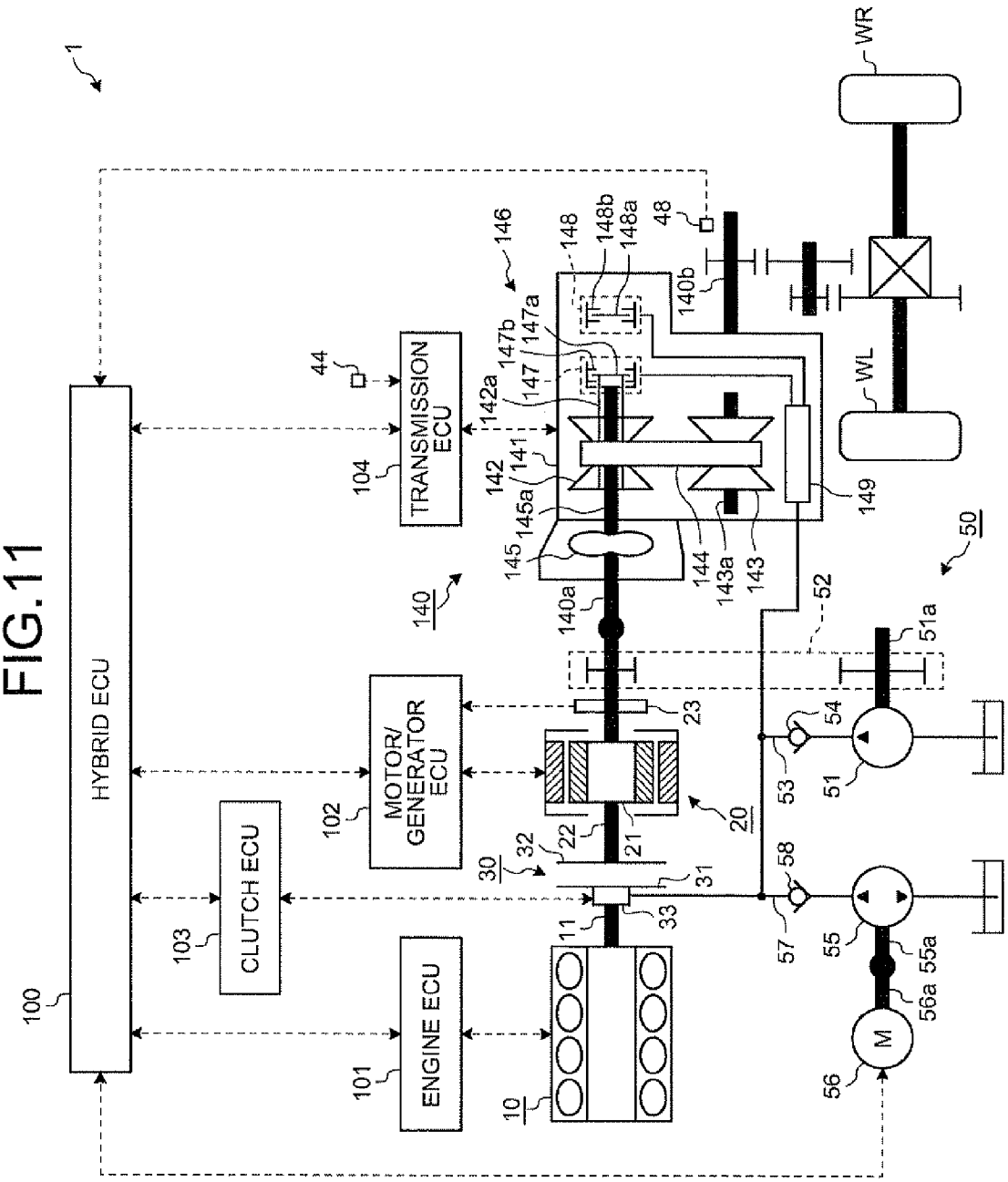
FIG. 11 is a diagram illustrating another example of the vehicle to which the power transmitting apparatus according to the present invention is applied.

While the stepped automatic transmission 40 has been illustrated in the above power transmitting apparatus, the transmission on a power transmission route may be a belt-type stepless automatic transmission 140 shown in FIG. 11 capable of switching the transmission gear stage steplessly and continuously. A transmission body 141 of the stepless automatic transmission 140 has a primary pulley 142 on a primary axis 142a, a secondary pulley 143 on a secondary axis 143a, and a belt 144 wound and looped over the primary pulley 142 and the secondary pulley 143 provided therein. The stepless automatic transmission 140 also has a torque converter 145 that transmits power input to an input axis 140a to the side of the transmission body 141 and a forward/backward switching device 146 that transmits power output from an output axis 145a of the torque converter 145 to the primary pulley 142 provided therein. The forward/backward switching device 146 also has a function to switch forward movement and backward movement of the hybrid vehicle 1. The secondary axis 143a is connected so as to rotate integrally with an output axis 140b of the stepless automatic transmission 140.

The forward/backward switching device 146 includes a forward clutch 147. The forward clutch 147 is a power transmission mode adjusting device (in other words, a power connecting/disconnecting device) that operates based on pressure of a fed fluid to switch a state in which power from the output axis 145a can be transmitted and a state in which the power cannot be transmitted. More specifically, the forward clutch 147 is, for example, a friction clutch that has a first engagement unit 147a and a second engagement unit 147b arranged opposite to each other and creates an engagement state and a disengagement state by adjusting the interval between these engagement units opposite to each other using a working fluid fed from the working fluid feeding device 50. For example, the first engagement unit 147a is connected so as to be able to rotate integrally with the primary axis 142a and the second engagement unit 147b is connected so as to be able to rotate integrally with the output axis 145a. Further, the second engagement unit 147b is connected so as to be able to rotate integrally with a ring gear of a planetary gear mechanism (not shown).

The forward/backward switching device 146 also includes a reverse brake 148. The reverse brake 148 is a power transmission mode adjusting device that operates based on pressure of the fed fluid to change the power transmission mode of the planetary gear mechanism placed between the forward clutch 147 and the reverse brake 148, thereby realizing switching of forward movement and backward movement. More specifically, the reverse brake 148 is configured like, for example, a friction clutch that has a first engagement unit 148a and a second engagement unit 148b arranged opposite to each other and creates an engagement state and a disengagement state by adjusting the interval between these engagement units opposite to each other using a working fluid fed from the working fluid feeding device 50. For example, the first engagement unit 148a is connected so as to rotate integrally with a pinion of the planetary gear mechanism via a forward/backward switching carrier (not shown) and the second engagement unit 148b is connected so as to rotate integrally with a casing (Trans-axle case) of the transmission body 141.

The transmission body 141 has a clutch driving device 149 that switches the engagement state and the disengagement state by adjusting pressure of the working fluid to the forward clutch 147 and the reverse brake 148 provided therein. As the clutch driving device 149, for example, an electromagnetic driving valve serving as a channel opening/closing valve that opens/closes the channel of a working fluid fed from the working fluid feeding device 50 or as a flow regulating valve that regulates the flow rate of the working fluid may be used. The operation of the clutch driving device 149 is controlled by the transmission ECU 104.

By making the forward clutch 147 engaged state and the reverse brake 148 disengaged state in the forward/backward switching device 146, power from the output axis 145a is transmitted to the primary pulley 142 as torque in a rotation direction for forward movement. On the other hand, by making both the forward clutch 147 and the reverse brake 148 engaged state in the forward/backward switching device 146, power from the output axis 145a is transmitted to the primary pulley 142 as torque in the rotation direction for backward movement.

Figure 8:
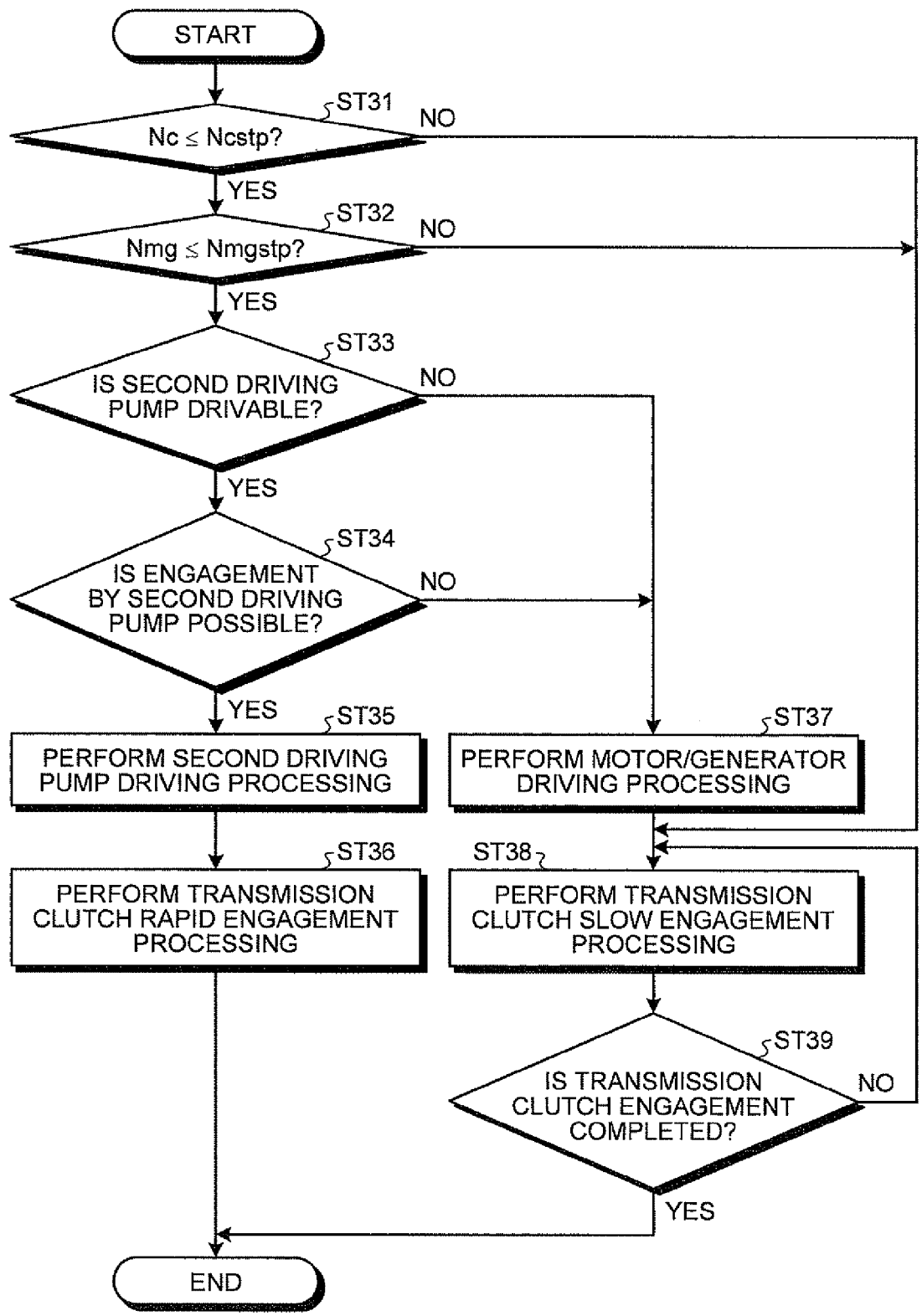
FIG. 8 is a flow chart explaining the engagement processing operation of a transmission clutch of the power transmitting apparatus according to the present invention.

The engagement operation of the forward clutch 147 and the reverse brake 148 is just like that of the transmission clutch 42 described above, and "transmission clutch" in the flow chart in FIG. 8 is replaced by "forward clutch" or "reverse brake" to perform the engagement operation.

That is, when the forward clutch 147 or the reverse brake 148 should be caused to engage, the forward clutch 147 or the reverse brake 148 is caused to engage rapidly by pressure of a working fluid (working oil) from the second driving pump 55 if the vehicle is stopped, the motor/generator 20 is not rotating, and the second driving pump 55 can be driven and used. Accordingly, in this case, responsiveness and controllability during engagement become better. Since no difference in rotation speed or torque has arisen between input and output of the forward clutch 147 or the reverse brake 148 before being engaged in this case, an occurrence of shock during engagement can be suppressed. Therefore, in this case, forward movement and backward movement can be switched with excellent responsiveness or controllability while suppressing an occurrence of shock during engagement.

When the motor/generator 20 is rotating even if the vehicle is stopped, by contrast, the forward clutch 147 or the reverse brake 148 is caused to engage slowly by pressure of a working oil from the first driving pump 51. Accordingly, in this case, forward movement and backward movement can be switched by relieving a shock accompanying the engagement even if a difference in rotation speed or torque has arisen between input and output of the forward clutch 147 or the reverse brake 148 before being engaged. Further, if the second driving pump 55 is not drivable or not usable, the motor/generator 20 is rotated if the motor/generator 20 is not rotating and the forward clutch 147 or the reverse brake 148 is caused to engage slowly in the same manner. Accordingly, in this case, the forward clutch 147 or the reverse brake 148 can be engaged while suppressing an occurrence of shock. Forward movement and backward movement are not switched while a vehicle is running and thus, if a determination is made in step ST31 that the vehicle is running, it is desirable to terminate this processing operation.

As described above, regardless of whether a difference in rotation speed or the like has arisen between input and output of the forward clutch 147 or the reverse brake 148 in the power transmitting apparatus, forward movement and backward movement can be switched while suppressing an occurrence of shock.

INDUSTRIAL APPLICABILITY

As described above, a power transmitting apparatus according to the present invention is useful for technology that suppresses an occurrence of shock when a power transmission mode adjusting device is engaged in the power transmitting apparatus including the power transmission mode adjusting device that adjusts the mode of power transmission from a power source by engaging or disengaging a first engagement unit and a second engagement unit by pressure of a fluid.

REFERENCE SIGNS LIST

1 HYBRID VEHICLE
10 ENGINE
20 MOTOR/GENERATOR
30 CLUTCH
31 FIRST ENGAGEMENT UNIT
32 SECOND ENGAGEMENT UNIT
33 CLUTCH DRIVING UNIT
40 STEPPED AUTOMATIC TRANSMISSION
42 TRANSMISSION CLUTCH
42A FIRST ENGAGEMENT UNIT
42B SECOND ENGAGEMENT UNIT
43 CHANNEL SWITCHING DEVICE
50 WORKING FLUID FEEDING DEVICE
51 FIRST DRIVING PUMP
55 SECOND DRIVING PUMP
56 MOTOR
140 STEPLESS AUTOMATIC TRANSMISSION
146 FORWARD/BACKWARD SWITCHING DEVICE
147 FORWARD CLUTCH
147A FIRST ENGAGEMENT UNIT
147B SECOND ENGAGEMENT UNIT
148 REVERSE BRAKE
148A FIRST ENGAGEMENT UNIT
148B SECOND ENGAGEMENT UNIT
149 CLUTCH DRIVING DEVICE
100 HYBRID ECU
101 ENGINE ECU
102 MOTOR/GENERATOR ECU
103 CLUTCH ECU
104 TRANSMISSION ECU
WL, WR DRIVE WHEEL

The invention claimed is:

1. A power transmitting apparatus, comprising:
a power transmission route that transmits output of at least one of a mechanical power source generating a driving force by using mechanical energy as power and an electric power source generating a driving force by using electric energy as power to a drive wheel side;
a power transmission mode adjusting device that operates based on pressure of a fed fluid to adjust a mode of power transmission from at least one of the mechanical power source and the electric power source on the power transmission route;
a first driving pump that feeds a fluid to the power transmission mode adjusting device by being driven in accordance with rotation of a rotation axis of the electric power source; and
a second driving pump that feeds a fluid to the power transmission mode adjusting device by being driven in accordance with electric power, wherein
a first engagement unit and a second engagement unit of the power transmission mode adjusting device are able to engage rapidly or slowly by selecting one of the first driving pump and the second driving pump as a source of a fluid to the power transmission mode adjusting device, and
when a drive request of the power transmission mode adjusting device is present and a rotation speed of the electric power source is lower than a predetermined rotation speed, the first engagement unit and the second engagement unit are caused to engage rapidly by feeding a fluid from the second driving pump.

2. The power transmitting apparatus according to claim 1, wherein when a drive request of the power transmission mode adjusting device is present and a rotation speed of the electric power source is higher than a predetermined rotation speed, the first engagement unit and the second engagement unit are caused to engage slowly by feeding a fluid from the first driving pump.

3. The power transmitting apparatus according to claim 2, wherein when a drive request of the power transmission mode adjusting device is present, the first engagement unit and the second engagement unit are caused to engage rapidly by a fluid from the second driving pump if there has arisen no difference in rotation speed or torque between the first engagement unit and the second engagement unit, and the first engagement unit and the second engagement unit are caused to engage slowly by a fluid from the first driving pump if there has arisen a difference.

4. The power transmitting apparatus according to claim 2, wherein the power transmission mode adjusting device is a clutch capable of connecting/disconnecting a power transmission from the mechanical power source to the drive wheel side.

5. The power transmitting apparatus according to claim 2, wherein the power transmission mode adjusting device is a transmission clutch inside a stepped automatic transmission causing connection/disconnection when a transmission gear stage of the stepped automatic transmission is switched on the power transmission route.

6. The power transmitting apparatus according to claim 2, wherein the power transmission mode adjusting device is a forward/backward switching device arranged inside a stepless automatic transmission on the power transmission route to switch forward movement and backward movement of a vehicle by switching connection and disconnection of the first engagement unit and the second engagement unit.

7. The power transmitting apparatus according to claim 1, wherein when a drive request of the power transmission mode adjusting device is present, the first engagement unit and the second engagement unit are caused to engage rapidly by a fluid from the second driving pump if there has arisen no difference in rotation speed or torque between the first engagement unit and the second engagement unit, and the first engagement unit and the second engagement unit are caused to engage slowly by a fluid from the first driving pump if there has arisen a difference.

8. The power transmitting apparatus according to claim 7, wherein the power transmission mode adjusting device is a clutch capable of connecting/disconnecting a power transmission from the mechanical power source to the drive wheel side.

9. The power transmitting apparatus according to claim 7, wherein the power transmission mode adjusting device is a transmission clutch inside a stepped automatic transmission causing connection/disconnection when a transmission gear stage of the stepped automatic transmission is switched on the power transmission route.

10. The power transmitting apparatus according to claim 7, wherein the power transmission mode adjusting device is a forward/backward switching device arranged inside a stepless automatic transmission on the power transmission route to switch forward movement and backward movement of a vehicle by switching connection and disconnection of the first engagement unit and the second engagement unit.

11. The power transmitting apparatus according to claim 1, wherein the power transmission mode adjusting device is a clutch capable of connecting/disconnecting a power transmission from the mechanical power source to the drive wheel side.

12. The power transmitting apparatus according to claim 11, wherein the clutch is arranged between the mechanical power source and the electric power source to be able to connect/disconnect a power transmission therebetween.

13. The power transmitting apparatus according to claim 11, wherein the clutch is arranged between the mechanical power source and the electric power source to be able to connect/disconnect a power transmission therebetween, and when the first engagement unit and the second engagement unit are caused to engage while the mechanical power source or the electric power source is rotating, the fluid is fed from the first driving pump to cause the first engagement unit and the second engagement unit to engage slowly.

14. The power transmitting apparatus according to claim 11, wherein the clutch is arranged between the mechanical power source and the electric power source to be able to connect/disconnect a power transmission therebetween, and when the mechanical power source is cranked by power of the electric power source, the first engagement unit and the second engagement unit are caused to engage before the mechanical power source being started.

15. The power transmitting apparatus according to claim 11, wherein the clutch is arranged between the mechanical power source and the electric power source to be able to connect/disconnect a power transmission therebetween, and when the clutch is in a disengagement state, the mechanical power source is started by using a starting apparatus that rotates the rotation axis of the mechanical power source while leaving the clutch in the disengagement state.

16. The power transmitting apparatus according to claim 1, wherein the power transmission mode adjusting device is a transmission clutch inside a stepped automatic transmission causing connection/disconnection when a transmission gear stage of the stepped automatic transmission is switched on the power transmission route.

17. The power transmitting apparatus according to claim 1, wherein the power transmission mode adjusting device is a forward/backward switching device arranged inside a stepless automatic transmission on the power transmission route to switch forward movement and backward movement of a vehicle by switching connection and disconnection of the first engagement unit and the second engagement unit.

* * * * *